(12) United States Patent
Pandey et al.

(10) Patent No.: US 8,331,282 B2
(45) Date of Patent: Dec. 11, 2012

(54) APPARATUS AND METHOD FOR ADAPTIVE CHANNEL HOPPING IN MESH NETWORKS

(75) Inventors: Raju Pandey, Davis, CA (US); Seokman Paul Han, Ranco Cordova, CA (US); Rituparna Ghosh, Folsom, CA (US)

(73) Assignee: SynapSense Corporation, Folsom, CA (US)

(*) Notice: Subject to any disclaimer, the term of this patent is extended or adjusted under 35 U.S.C. 154(b) by 602 days.

(21) Appl. No.: 12/005,719

(22) Filed: Dec. 28, 2007

(65) Prior Publication Data

US 2009/0168796 A1    Jul. 2, 2009

(51) Int. Cl.
*H04B 7/212* (2006.01)
(52) U.S. Cl. .................. 370/322; 370/458; 455/455
(58) Field of Classification Search .................. 370/458, 370/459, 436, 468
See application file for complete search history.

(56) References Cited

U.S. PATENT DOCUMENTS

| | | | |
|---|---|---|---|
| 5,379,290 A | 1/1995 | Kleijne | |
| 5,515,369 A | 5/1996 | Flammer, III | |
| 5,896,412 A | 4/1999 | Levanon | |
| 6,094,425 A * | 7/2000 | Auger et al. | 370/330 |
| 6,208,247 B1 | 3/2001 | Agre | |
| 6,404,756 B1 * | 6/2002 | Whitehill et al. | 370/338 |
| 6,442,596 B1 | 8/2002 | Dyer | |
| 6,480,497 B1 | 11/2002 | Flammer, III | |
| 6,590,928 B1 | 7/2003 | Haartsen | |
| 6,735,630 B1 | 5/2004 | Gelvin | |
| 6,807,165 B2 * | 10/2004 | Belcea | 370/347 |
| 6,850,502 B1 | 2/2005 | Kagan | |
| 6,856,591 B1 | 2/2005 | Ma et al. | |
| 6,859,831 B1 | 2/2005 | Gelvin | |
| 7,010,392 B2 | 3/2006 | Bash | |
| 7,020,701 B1 | 3/2006 | Gelvin | |
| 7,031,329 B2 | 4/2006 | Lipsanen | |
| 7,031,870 B2 | 4/2006 | Sharma et al. | |
| 7,086,603 B2 | 8/2006 | Bash | |
| 7,113,519 B2 * | 9/2006 | Hammel et al. | 370/458 |
| 7,176,808 B1 | 2/2007 | Broad | |

(Continued)

FOREIGN PATENT DOCUMENTS

CA    2616715    2/2007

(Continued)

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

(Continued)

*Primary Examiner* — Kevin C Harper
*Assistant Examiner* — Henry Baron
(74) *Attorney, Agent, or Firm* — Salter IP Law; Jim H. Salter

(57) ABSTRACT

Various embodiments provide an apparatus and method for adaptive channel hopping in a mesh network. An example embodiment is configured to divide a time period into a plurality of frames; subdivide each of the plurality of frames into a plurality of slots, each of the plurality of slots providing a time segment for local data communication between nodes in a mesh network; enable a first node to dynamically assign itself a first channel for local data communication, the first node using the first channel to receive data communications destined for the first node; and communicate to other nodes of the mesh network information indicative of the first node's dynamic assignment of the first channel.

25 Claims, 7 Drawing Sheets

U.S. PATENT DOCUMENTS

| | | |
|---|---|---|
| 7,180,915 B2 | 2/2007 | Beyer |
| 7,272,129 B2 | 9/2007 | Calcev |
| 7,463,644 B2 | 12/2008 | Zhu |
| 7,502,360 B2 * | 3/2009 | Liu et al. .................. 370/348 |
| 7,680,092 B2 | 3/2010 | Van Laningham |
| 2002/0073152 A1 | 6/2002 | Andrew |
| 2003/0067892 A1 | 4/2003 | Beyer |
| 2005/0024826 A1 | 2/2005 | Bash |
| 2005/0030968 A1 | 2/2005 | Rich et al. |
| 2005/0074025 A1 | 4/2005 | Shao et al. |
| 2005/0129051 A1 | 6/2005 | Zhu |
| 2005/0173549 A1 | 8/2005 | Bash |
| 2005/0201340 A1 | 9/2005 | Wang |
| 2005/0213612 A1 | 9/2005 | Pister |
| 2005/0239411 A1 | 10/2005 | Hazra |
| 2006/0029060 A1 | 2/2006 | Pister |
| 2006/0029061 A1 | 2/2006 | Pister |
| 2006/0034191 A1 * | 2/2006 | Sahinoglu et al. ........ 370/254 |
| 2006/0126501 A1 | 6/2006 | Ramaswamy |
| 2006/0149408 A1 | 7/2006 | Speetzer |
| 2006/0161909 A1 | 7/2006 | Pandey |
| 2006/0198346 A1 | 9/2006 | Liu |
| 2006/0215581 A1 | 9/2006 | Castagnoli |
| 2006/0215583 A1 | 9/2006 | Castagnoli |
| 2006/0225446 A1 | 10/2006 | Bash |
| 2006/0268791 A1 | 11/2006 | Cheng |
| 2006/0269028 A1 | 11/2006 | Bley |
| 2007/0050523 A1 | 3/2007 | Emeott |
| 2007/0116060 A1 | 5/2007 | Qu |
| 2007/0208992 A1 | 9/2007 | Koren |
| 2007/0211686 A1 | 9/2007 | Belcea |
| 2007/0258508 A1 | 11/2007 | Werb |
| 2008/0008138 A1 * | 1/2008 | Pun .......................... 370/338 |
| 2008/0019265 A1 | 1/2008 | Alluisi et al. |
| 2008/0019302 A1 | 1/2008 | Nagarajan et al. |
| 2008/0043707 A1 | 2/2008 | Ren |
| 2008/0095222 A1 | 4/2008 | Van Laningham |
| 2008/0151801 A1 | 6/2008 | Mizuta |
| 2008/0269932 A1 | 10/2008 | Chardon |
| 2008/0298450 A1 | 12/2008 | Zhang |
| 2009/0109992 A1 | 4/2009 | Lurie et al. |

FOREIGN PATENT DOCUMENTS

| | | |
|---|---|---|
| CN | 101401480 | 4/2009 |
| DE | 202006019810 | 5/2007 |
| EP | 1719301 | 11/2006 |
| EP | 1911184 | 4/2009 |
| JP | 2004-336779 | 11/2004 |
| JP | 2006-311549 | 11/2006 |
| JP | 2009504010 | 1/2009 |
| KR | 10-0646748 | 11/2006 |
| KR | 10-2007-0009390 | 1/2007 |
| KR | 10-2007-0105731 | 10/2007 |
| WO | WO2005083953 | 9/2005 |
| WO | WO2007015962 | 6/2007 |
| WO | WO2008021278 | 7/2008 |

OTHER PUBLICATIONS

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

* cited by examiner

| Name | Channel Width | # of Channels | Data Rate | Operating Range | Power |
|---|---|---|---|---|---|
| Wi-Fi (802.11b) | 22 MHz | 13 | 11 Mbps | ~150 m | 100 mw |
| Bluetooth | 15 MHz | 79 | 1 Mbps (v1.2) 3 Mbps (v2) | ~1 meter (Class 1) ~10 m (Class 2) ~100m (Class 3) | 2.5mw |
| WirelessUSB | 1 MHz | 79 | 62.5 Kbps | ~50 m | |
| (802.15.4) | 3MHz | 16 | 128 Kbps | ~20-100 m | 1mw |

Figure 3
(Prior Art)

APPARATUS AND METHOD FOR ADAPTIVE CHANNEL HOPPING IN MESH NETWORKS

CROSS-REFERENCE TO RELATED PATENT APPLICATION

This non-provisional patent application is related to the U.S. patent application Ser. No. 12/001,884, filed Dec. 12, 2007, entitled, "APPARATUS AND METHOD FOR ADAPTIVE DATA PACKET SCHEDULING IN MESH NETWORKS", and assigned to the same assignee as the present patent application.

TECHNICAL FIELD

The disclosed subject matter relates to the field of network communications, and more particularly to data communications in mesh networks.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g. radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (the nodes are "plugged in") or from batteries in each node. As the size, power, and cost of the computation and communication requirements of these devices has decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, particle counts, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensor. Further, it is important to monitor the operational status of each of the sensors.

Given that most WSN devices are battery powered, the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on only when devices need to send and/or receive data. The operational lifetime of the network, thus, depends on the ability to identify and schedule wakeup and sleep times for the radios in the wireless network nodes.

Time division multiple access (TDMA) is a well-known channel access method for shared medium (usually radio) networks. TDMA allows several users to share the same frequency channel by dividing the signal into different timeslots. The users transmit in rapid succession, one after the other, each using his/her own timeslot. This allows multiple stations to share the same transmission medium (e.g. radio frequency channel) while using only the part of the available bandwidth. The timeslot definition and allocation in TDMA, however is usually determined globally for all nodes. It is therefore harder to modify the timeslot definition and allocation in TDMA if the network configuration or communication requirements change.

In CSMA/CA (Carrier Sense Multiple Access With Collision Avoidance), a station that wants to transmit a packet first listens to the shared channel for a predetermined amount of time to determine if the channel is busy or not. If the channel is sensed idle, then the station is allowed to transmit. If the channel is busy, the station defers its transmission. Once the channel is clear, a station sends a short signal telling all other stations not to transmit, and then sends its packet. In Ethernet 802.11, the station continues to wait for a random amount of time (to reduce the probability of collision), and checks to see if the channel is still free. If it is free, the station transmits, and waits for an acknowledgment signal that the packet was received. CSMA/CA is used where collision detection cannot be implemented due to the nature of the channel. CSMA/CA is typically used in 802.11 based wireless local area networks (LAN's); because, it is not possible to listen to the channel while sending. Therefore, collision detection is not possible. Another reason is the hidden terminal problem, where node A, in range of the receiver R, is not in range of another node B, and therefore cannot know if B is transmitting to R.

In Asynchronous Transfer Mode (ATM) systems, a fixed-size data cell is transmitted in a channel-specific time period of fixed duration during which a unit of communication occurs between two fixed terminals without conflict. The motivation for the use of small data cells in ATM networks was the reduction of jitter (delay variance, in this case) in the multiplexing of data streams. The reduction of jitter (and also end-to-end round-trip delays) is particularly important when carrying voice traffic. Again however, the cell definition and communication in ATM is fixed and non-adaptable.

Wireless sensor networks are often deployed in adverse environments that contain significant amounts of radio frequency (RF) interference/noise. This noise can arise from machinery (such as pumps), electronic equipment (such as microwaves and wireless phones), or other network devices that operate in the same frequency range. The RF noise will often lead to network packet losses and packet corruption. In some cases, the RF noise may render the entire network inoperable and unreachable. It is important in such adverse wireless networking environments to minimize the impact of RF interference on network operation.

U.S. Pat. No. 5,515,369 describes a technology for use in a wireless packet communication system having a plurality of nodes, each having a transmitter and a receiver, the receiver at each node is assigned a seed value and is provided with a channel punchout mask. A node uses its seed value and punchout mask to generate a specific randomly ordered channel hopping band plan on which to receive signals. A node transmits its seed value and punchout mask to target nodes with which it wants to establish communication links, and those target nodes each use the seed value and punchout mask to generate the randomly ordered channel hopping band plan for that node. Subsequently, when one of the target nodes wishes to transmit to the node, the target node changes frequency to the frequency of the node according to that node's band plan.

U.S. Pat. No. 6,590,928 describes a wireless network including master and slave units. The master sends a master address and clock to the slaves. Communication is by means of a virtual frequency hopping channel whose hopping sequence is a function of the master address, and whose phase is a function of the master clock. Transmitted inquiry messages solicit slave address and topology information from the slaves, which may be used to generate a configuration tree for determining a route for a connection between the master and slave units.

U.S. Pat. No. 6,480,497 describes a technology for use in a mesh network communication system, where net throughput is optimized on the link between the communicating nodes by dynamically modifying signal characteristics of the signals transmitted between nodes in response to performance metrics which have been determined from analysis at the receivers for the corresponding links. The signal characteristics can be the data rate, modulation type, on-air bandwidth, etc. The performance metrics are calculated based on data-link on-air characteristics of received signals.

U.S. Patent Application No. 20070258508 describes a method and apparatus for communication in a wireless sensor network. In one embodiment, one or more routers in a network may be available for communication with one or more star nodes at a randomized time and/or frequency. A connectivity assessment, which may be performed at several different frequencies and/or times, may be performed to evaluate the quality of communications between devices in the network. Primary and secondary communication relationships may be formed between devices to provide for system redundancy. One or more proxies may be maintained where each proxy includes a status of one or more devices in the network, e.g., one or more star nodes or routers. Proxies may be used to handle information requests and/or status change requests, e.g., a proxy may be requested to change a communication relationship between devices in the network and may generate command signals to cause the corresponding devices to make the change.

Thus, an apparatus and method for adaptive channel hopping in a mesh network are needed.

BRIEF DESCRIPTION OF THE DRAWINGS

Embodiments illustrated by way of example and not limitation in the figures of the accompanying drawings, in which:

FIGS. 3 and 4 illustrate some of the RF characteristics of the different conventional 2.4 GHz technologies.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for adaptive channel hopping in a mesh network. A particular embodiment relates to wireless data networks and more particularly to a multiple-hop wireless radio frequency mesh network adaptive data communications process employing a packet-switched time-sharing communications protocol. The particular embodiment has application to data collection from an array of sensors disposed in a network topology wherein at least two intelligent communication nodes are within reliable radio communication range within an array of peer communication nodes. The particular embodiment of an example system and method described herein presents an adaptive approach for channel hopping in the wireless data network radios in a wireless sensor node so that resiliency to RF interference can be improved. The network and node configuration in a particular embodiment are described in more detail below.

Figure 1:
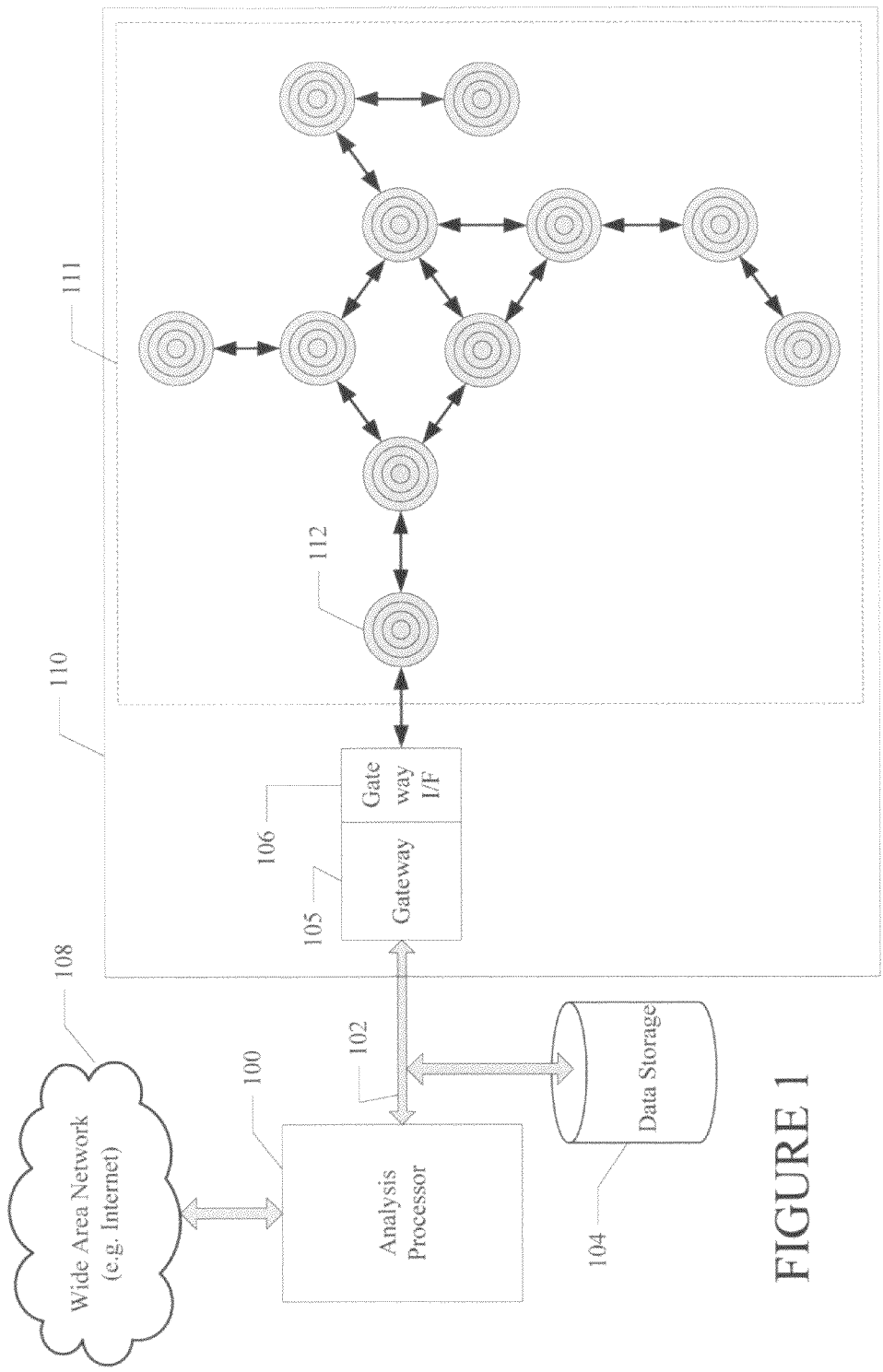
FIG. 1 illustrates a mesh network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 and a gateway device 105 (collectively denoted nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node has a unique identifier. A data packet or message is a selfcontained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the other nodes of WSN 110 can obtain access to the Internet.

Gateway 105 can also provide synchronization timing for the nodes 112 of WSN 110. Gateway 105 can send periodic messages to each of the nodes 112 of WSN 110. These periodic messages can include a timing signal to which each of the nodes 112 can synchronize their internal timers. Similarly, messages from gateway 105 to each of the nodes 112 can be used to provide system status, configuration, and control settings for the nodes of WSN 110. In an alternative embodiment, any of the nodes of the network or an agent may provide a network management message including the synchronization (timing) signal for the other network nodes. Alternatively, an external signal source may be used as a basis for the time synchronization of network nodes. The transfer of messages between the gateway 105 and each of the nodes 112 or between a node 112 and all other nodes of WSN 10 in a broadcast or multicast transmission is termed a global communication. According to a particular embodiment, communication between nodes 112 and/or between nodes 112 and gateway 103 occurs only at specific times and on specific channels for local and global data communications.

The WSN 110 can be configured in any of a variety of ways. Nodes 112 can be added, removed, or moved within the array of nodes of WSN 110. Each of the nodes of WSN 110 includes functionality to join or reconfigure itself in the WSN 110 when a node is added or moved. As part of this functionality, each node 112 can discover its neighbor nodes and automatically negotiate and establish communication paths with those neighbors. A node can be in data communication with neighbors that are within the radio reception range of the node. Depending on the strength of the wireless transceivers (e.g. radios) within each node of WSN 110, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
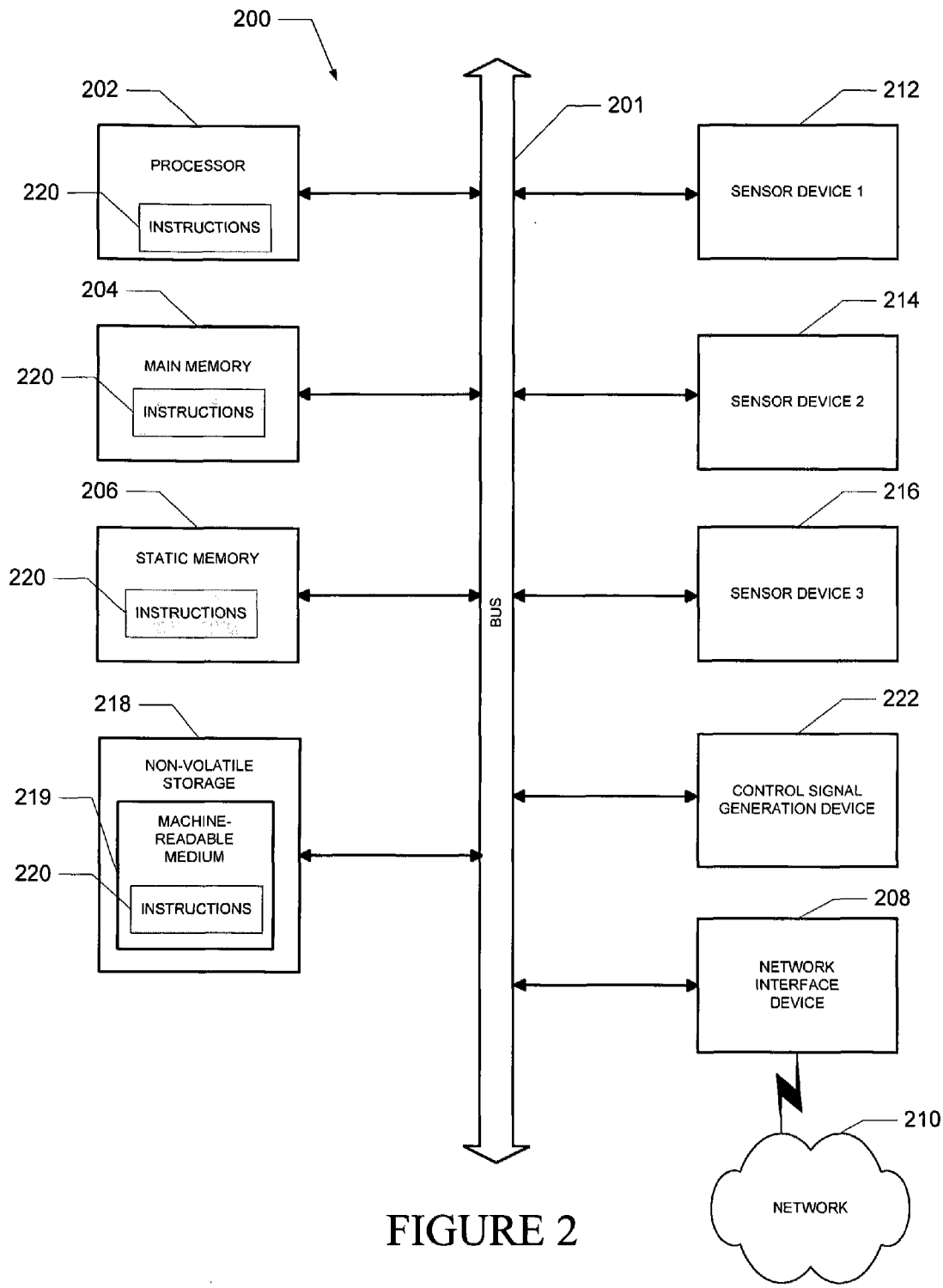
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 of a particular embodiment includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, particle counters, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, machine system activation and status, and the like. In general, sensor devices 212, 214, and 216 can include any sensors for detecting and measuring a desired condition within an environmental management system, process control system, building management system, or the like.

The node 200 may further include a non-volatile memory 218, a control signal generation device 222, and a network interface device 208 (e.g. a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g. radios) in the network nodes consume the most electrical power and represent the largest drain on the node's battery power. As such, the radio should be turned off for most of the time to increase the battery lifetime of the nodes. In an example embodiment, all nodes of WSN 110 are time synchronized. Each node wakes up for a short period of time for radio communication with other nodes or the gateway. Then, the node's radio is shut off and the node sleeps until the next scheduled communication cycle.

In conventional wireless network systems, a cycle time is divided into a fixed plurality of communication time slots, during each of which one of the nodes transmits. During normal operations of the WSN 110, each slot becomes active sequentially in a round-robin fashion during the cycle time. Only one node can send data in a given slot. If multiple nodes have a packet to send, the nodes compete for the slot using a Carrier Sense Multiple Access (CSMA) protocol. This well-known scheme is fairly inefficient and does not scale to large number of nodes. As the number of packets being communicated in the network increases, the network becomes unreliable; because, there is a high probability that the packets collide (i.e. packets get transmitted on the same channel at the same time by more than one node causing the data communication to become garbled and unusable). As packets collide, there are more retransmissions, causing even more collisions. Further, as RF interference in the network environment interrupts a communication channel implemented on a particular radio frequency, further retransmissions are required. One simple solution is to increase the number of slots in the cycle. However, this solution causes the nodes to wake up more often causing the nodes to consume more power. Moreover, additional slots do not address the problem of packet losses due to RF radio interference.

Many wireless sensor networks use conventional 802.15.4 based radios that operate in the 2.4 GHz industrial scientific and medical (ISM) unlicensed band. The ISM band is also used by IEEE 802.11b (WLAN), IEEE 802.15.1 (Bluetooth), wireless USB, and microwave ovens. The table illustrated in FIG. 3 summarizes some of the RF characteristics of the different conventional 2.4 GHz technologies.

Figure 4:
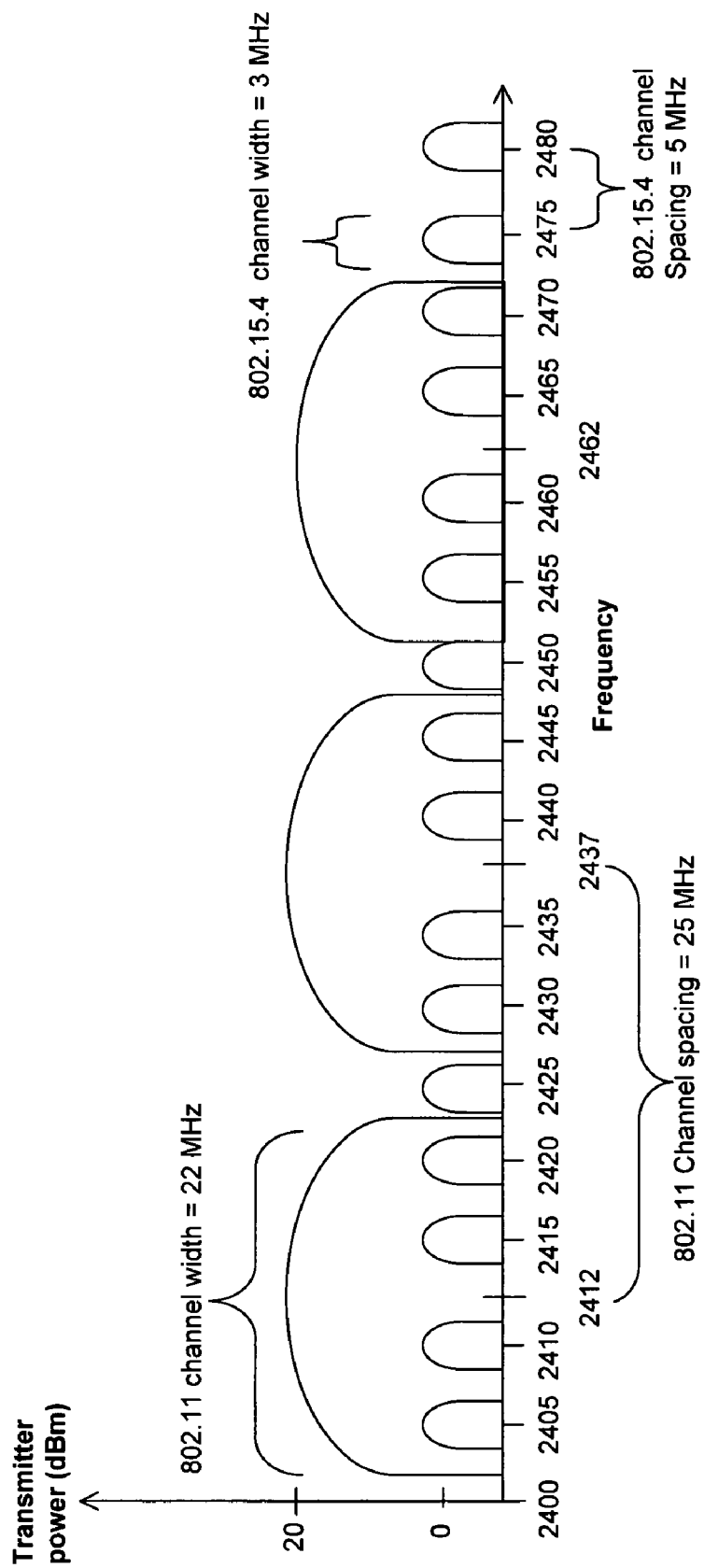

Referring now to FIG. 4, conventional Wi-Fi (802.11b) technology uses the 2.4 GHz ISM band by dividing the band into 14 possible channels, with each channel being 22 MHz wide. This configuration allows up to three evenly-distributed concurrent channels. FIG. 4 shows three concurrent Wi-Fi channels that illustrate the 802.11 channel width and the 802.11 channel spacing. Conventional 802.15.4 based radios use the 2.4 GHz ISM band by dividing the band into channels, with each channel being 3 MHz wide. This configuration allows up to 16 evenly-distributed concurrent channels. FIG. 4 shows 16 concurrent 802.15.4 channels that illustrate the 802.15.4 channel width and the 802.15.4 channel spacing. In FIG. 4, the Y-axis shows the power differences between the 802.11 and 802.15.4 transmitters. As shown, the 802.11 transmitters use substantially more power than the 802.15.4 transmitters.

In a particular embodiment, an 802.15.4 transmitter is used in each network node for network communications. It will be apparent to those of ordinary skill in the at that other types of radios, transceivers, or channel configurations can be used within the scope of the various embodiments described herein.

As described herein, an adaptive channel hopping system and method is disclosed for reducing the interference from various sources of RF interference/noise. Further, the various embodiments address the issues of radio interference, co-existence, and interoperation among the different 2.4 GHz radio technologies. As described in more detail herein, various embodiments include 1) techniques for scheduling radio channels on which different devices can operate; 2) techniques for identifying RF noise on specific frequency bands; 3) techniques for discovering bands that are noise-free; and 4) techniques for adapting the network to communicate on noise-free channels.

In a particular embodiment, global time is represented as a time period divided into a plurality of frames. Each frame is further subdivided into a plurality of slots. Each of the plurality of slots provides a time segment for local data communication between nodes in a mesh network. The network nodes use the slots to synchronize and send messages to other network nodes. In addition, for each time slot, each node can create an adaptive sequence of communication channels that the node will use for communicating with other network nodes. As will be described in more detail below, the sequence of communication channels allows a node to select a noise-free channel from the sequence of communication channels and to adapt network communications to use the noise-free channels, thereby improving the reliability and throughput of the network.

Figure 5:
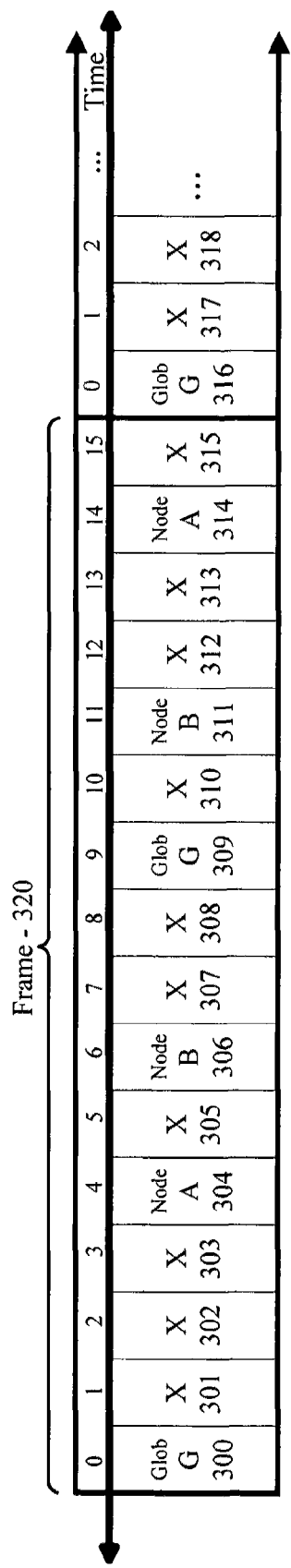
FIG. 5 illustrates a frame and a plurality of component slots in a particular embodiment.

FIG. 5 illustrates a frame 320 and a plurality of component slots 300-315. In the particular embodiment shown, the frame 320 is divided into 16 slots; however, other embodiments can use an arbitrary number of slots per frame. It will be understood by those of ordinary skill in the art that the size of the time frame, the number of slots within a frame, and the distribution of slots within the frame can all be variable and still fall within the scope of the claims herein. A node of WSN 110 can select and dynamically assign to itself one or more slots 300-315 of frame 320 in which the node can receive messages from other nodes, including the gateway 105. In a particular embodiment, a node of WSN 110 can randomly select one or more slots 300-315 of frame 320 using a randomizer. Other techniques for slot assignment are also described herein. A complete description of various adaptive slotting techniques is provided in the co-pending patent application referenced above.

After having assigned to itself one or more slots 300-315 of frame 320, each node of WSN 110 can select and dynamically assign to itself a sequence of communication channels that the node will use for network communications. Each node can use one of the communication channels of the sequence of channels to send or receive messages to/from other nodes, including the gateway 105. In a particular embodiment, a node of WSN 110 can randomly select one or more communication channels of the available channels (e.g. available 802.15.4 channels such as those illustrated in FIG. 4) using a randomizer. Other techniques for channel selection and assignment are also described herein.

Once a node has assigned to itself a number of slots and a communication channel sequence, the node communicates its slot/channel assignments to other nodes in the mesh network in a slot/channel assignment advertisement message. As nodes detect changes in the network traffic in the mesh network, each node can increase or decrease the number of slots the node has assigned to itself to adapt to changing network traffic requirements and environmental conditions. Additionally, as nodes detect RF interference on a particular communication channel, each node can adaptively modify the channel being used for network communications and switch to another channel in the sequence of channels to find a noise-free channel.

As described in more detail below, the adaptive channel hopping system and method of a particular embodiment is described in terms of the four phases mentioned above: (1) slot and channel assignment, (2) slot and channel advertisement, (3) communication, and (4) slot and channel adaptation. Each of these phases is described in more detail below in connection with a particular example embodiment.

Slot and Channel Assignment

Referring again to FIG. 5, an initial process includes dividing global time into frames 320, typically of equal sizes. Each frame 320 is further sub-divided into a plurality of slots 300-315, which are used for global and local communication. In a particular embodiment, one or more of slots 300-315 can be defined as global slots, which are used for global communication messages that are destined for all nodes or multiple nodes in the network. Examples of global communications include time synchronization messages (e.g. beacons), control commands, and other network management messages. Global communication slots can be deterministically selected. The gateway 105 can be the master of managing the global communication slots and responsible for choosing those slots. However, in an alternative embodiment, one or more nodes of WSN 110 can assign the global communication slots with agreements from the other nodes. The global slots represent time periods at which all or multiple network nodes can wake up and receive network messages. As shown in the example of FIG. 5, the assigned global slots in an example embodiment are slot 300 and slot 309 of frame 320. Each global slot is tagged for purposes of illustration in FIG. 5 with the letter "G". As also shown in FIG. 5, the currently unassigned (available) slots in the example embodiment are slots 301-303, 305, 307-308, 310, 312-313, and 315 of frame 320. Each unassigned slot is tagged for purposes of illustration in FIG. 5 with the letter "X". When the network 110 and its component nodes 112 are first initialized, the slot assignments for frame 320 can all be initialized to unassigned (available). The slot assignments are retained by each node in a data structure resident in or available to each node. As slot assignments are made, this data structure is updated using the advertisement process described below to reflect the current slot assignment status for all nodes in the network. Thus, at any moment, any node can determine which of slots 300-315 are unassigned and to which nodes in the one hop neighborhood others of the slots are assigned.

In the example embodiment shown in FIG. 5, two nodes of WSN 110 have found unassigned time slots and have already assigned themselves slots in frame 320. In particular, node A has dynamically assigned to itself slots 304 and 314. These assigned slots can be used by node A for receiving data from other nodes in a local communication. The slots assigned to node A are tagged for purposes of illustration with the letter "A" as shown in FIG. 5. Node B has dynamically assigned to itself slots 306 and 311. These assigned slots can be used by node B for receiving data from other nodes in a local communication. The slots assigned to node B are tagged for purposes of illustration with the letter "B" as shown in FIG. 5. It will be apparent to those of ordinary skill in the art that nodes A and B (and other nodes of WSN 110) could each have assigned themselves a fewer or greater number of unassigned slots of frame 320. By assigning more slots to itself, a node increases the bandwidth (i.e. data transfer capacity) the node has for data communication on the WSN 110. However, a greater number of slot allocations also increases the node's power consumption rate for such data communications. Thus, each node has an incentive to assign only a quantity of slots to itself that are necessary to accommodate the specific data communication requirements for the particular node. Because the gateway 105 is powered most of time, every global slot is usually assigned by the gateway 105. Also, the same slot may be assigned to multiple nodes in which case both assigned nodes can receive data during the assigned time slot.

In a particular embodiment, each node can randomly select one or more specific time slots for itself using a randomizer. In a random selection process, a particular node is equally likely to select any one of the unassigned slots in frame 320. In an alternative embodiment, each node can select one or more specific time slots for itself using a deterministic selection. In another alternative embodiment, each node can select one or more specific time slots for itself using a weighted selection process that biases a particular node's slot selection based on the particular node's position in the mesh network. In this manner, nodes that are neighbors on a data path may select slots in a staggered position in the frame 320 to increase the efficiency of the resulting pipelined data communications over the data path. Other alternative embodiments for a slot selection process will become apparent to those of ordinary skill in the art upon reading the disclosure herein.

Figure 6:
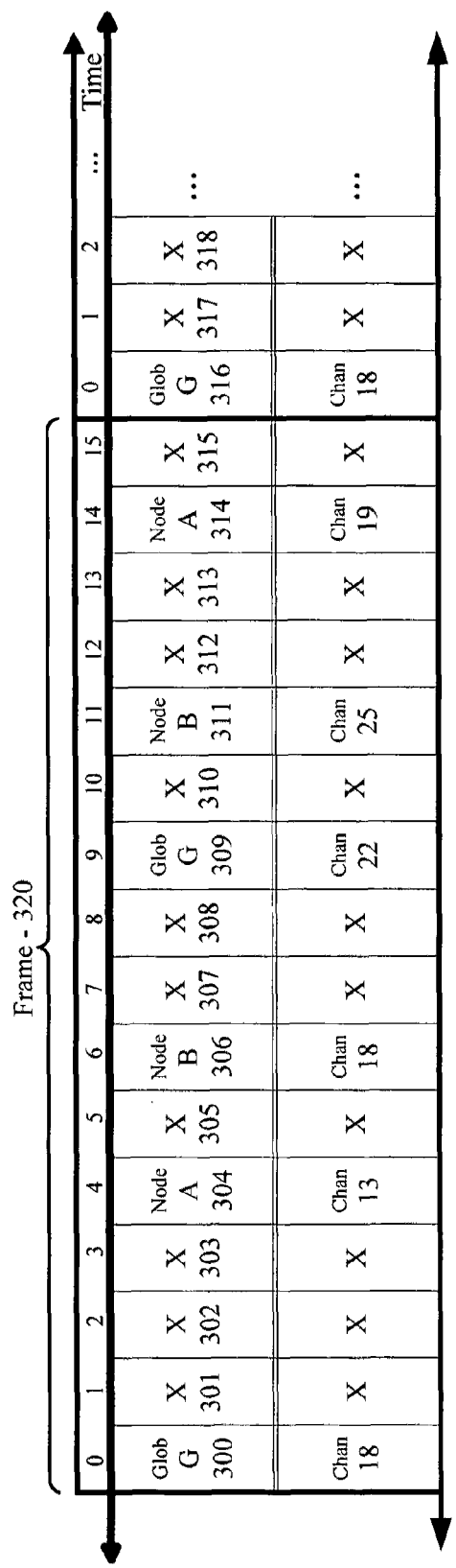
FIG. 6 illustrates a plurality of slots and corresponding channel assignments in a particular embodiment.

Referring now to FIG. 6, the initial process of slot assignment has been completed as described above for the example of FIG. 5. Once slot assignment is complete, each node of WSN 110 can select and dynamically assign to itself a sequence of communication channels that the node will use for network communications. Each node can use one or more of the communication channels of the sequence of channels to send or receive messages to/from other nodes, including the gateway 105. In a particular embodiment, a node of WSN 110 can randomly select one or more communication channels of the available channels (e.g. available 802.15.4 channels such as those illustrated in FIG. 4) using a randomizer. In one embodiment, the gateway 105, or other network controller, can select and assign the sequence of communication channels that the network nodes will use for global network communications during the global slots. As shown in the example of FIG. 6, the gateway 105 has assigned channel 18, for example, for global time slot 300 and channel 22 for global time slot 309. Given this sample channel sequence for the global slots, all or a multiple of nodes of WSN 110 will wake up and listen on the assigned channel during the corresponding global time slot.

As also shown in FIG. 6, the currently unassigned (available) slots in the example embodiment, have not been assigned a channel. Each unassigned slot/channel number is tagged for purposes of illustration in FIG. 6 with the letter "X". When the network 110 and its component nodes are first initialized, the slot assignments and channel assignments for frame 320 can all be initialized to unassigned (available). The slot assignments and channel assignments are retained by each node in a data structure resident in or available to each node. As slot assignments and channel assignments are made, this data structure is updated using the advertisement process described herein to reflect the current slot assignment and channel assignment status for all nodes in the network. Thus, at any moment, any node can determine which of slots 300-315 are unassigned, to which nodes in the one hop neighborhood others of the slots are assigned, and which channel assignments have been made in the assigned slots.

In the example embodiment shown in FIG. 6, two nodes of WSN 110 have already assigned themselves slots in frame 320. As described above, node A has dynamically assigned to itself slots 304 and 314. Node B has dynamically assigned to itself slots 306 and 311. Once these nodes have assigned slots to themselves, each node can also assign to itself a sequence of communication channels corresponding to each of its assigned slots. In the example of FIG. 6, node A has chosen channel 13 for slot 304 and channel 19 for slot 314. These assigned channels can be used by node A for sending and receiving data from other nodes in a local communication during the corresponding time slot. The sequence of communication channel assignments for node A are shown in the example of FIG. 6. In the example of FIG. 6, node B has chosen channel 18 for slot 306 and channel 25 for slot 311. These assigned channels can be used by node B for sending and receiving data from other nodes in a local communication during the corresponding time slot. The sequence of communication channel assignments for node B are shown in the example of FIG. 6. It will be apparent to those of ordinary skill in that art that nodes A and B (and other nodes of WSN 110) could each have assigned themselves any of the available channels for network communications during the node's assigned time slots. Note that in the example of FIG. 6, Node B has assigned to itself the same channel number used for global communications (i.e. channel 18). This is permissible in a particular embodiment. By assigning a greater variety of channel numbers to itself, a node may be less susceptible to RF interference on a particular channel. However, a greater variety of channel number assignments may also increase the likelihood that a node may encounter RF interference at some time during its local data communications.

In a particular embodiment, each node can randomly select one or more specific channels for itself using a randomizer. In a random selection process, a particular node is equally likely to select any one of the available channels for the node's assigned slots in frame 320. In an alternative embodiment, each node can select one or more specific channels for itself using a random selection with no repetition. In another alternative embodiment, each node can select one or more specific channels for itself using a random selection with repetition. In another alternative embodiment, each node can select one or more specific channels for itself using a deterministic selection. In another alternative embodiment, each node can select one or more specific channels for itself using pre-defined channel groups. The channel groups can be configured to focus particular node channel assignments in a desired pattern. In an alternative embodiment, each node can select one or more specific channels for itself using a selection process based on environmental factors associated with the quality of data communications. During the operational phase of the network and as described in more detail below, particular channels may be determined to be of greater or lesser quality based on empirical data collected during operation of the network. This empirical data can also serve as a factor considered by a node during the channel selection process. For example, a particular channel found to be of low quality (e.g. highly susceptible to RF interference) based on the empirical data may be given a low quality rating. The low quality rating for the channel would cause the channel to be rarely (or never) selected for use by a node during the channel selection process. Other alternative embodiments for a channel selection process will become apparent to those of ordinary skill in the art upon reading the disclosure herein.

Slot and Channel Assignment Advertisement

Once nodes have assigned one or more time slots and channels to themselves, the nodes advertise their slot and channel assignment information to their neighbor nodes in a slot and channel assignment advertisement message. The slot and channel assignment advertisement message can carry a unique message identifier or the slot and channel assignment information can be appended to a general system status/configuration message. The slot and channel assignment information received from a neighbor node is retained by each node in the slot and channel assignment data structure described above. This slot and channel assignment data structure can be retained as an updated copy resident in each node or maintained centrally and made accessible to each node. The nodes in the WSN 110 can collect slot and channel assignment information from neighbor nodes that are one-hop away and, in other cases, from neighbor nodes that are multiple hops distant. In this manner, slot and channel assignment information is propagated around the network as a node makes or changes a slot and/or channel assignment. Each node can use the current slot and channel assignment information to create a local schedule for the data that the node can transfer. Once the node has assigned one or more slots and channels to itself and propagated the slot and channel assignment(s) to the other nodes in the network, the node making the slot and channel assignment may then begin to listen for a local data communications being sent to the node during its assigned time slot(s) on its assigned channel(s). Additionally, the node may listen for a global data communication being sent to the node during the assigned global time slot(s) on the assigned global channel(s). In an alternative embodiment, other nodes of the mesh network can query a node for its slot and channel assignment information.

Communication

In a particular embodiment, there are several forms of communication in WSN 110. In a first form of data communication in WSN 110, a node 112 or the gateway 105 can broadcast or multicast data packets in a global communication to all devices or multiple devices in network 110. In a second form of data communication in WSN 110, a node 112 or the gateway 105 can unicast data packets in a local data communication to a specific device in network 110. These forms of communication in WSN 110 are described in more detail below.

When a node of WSN 110 wants to send data in a broadcast or multicast to all nodes or other multiple destination nodes in a global data communication, the sender node checks the slot and channel assignment information data structure to determine which slots and channels have been assigned for global communication. Referring again to FIG. 6, the slots assigned for global communication in the illustrated example embodiment are slots 300 and 309 of frame 320. The channels assigned for global communication in the illustrated example embodiment are slots channel 18 for slot 300 and channel 22 of slot 309 of frame 320. The sender node can then sleep (e.g. transition to a low power idle mode with the data communication radio deactivated) until the next global slot becomes active. When the next global slot becomes active, the sender node can wake up and begin the global data communication to all nodes or other multiple destination nodes on the corresponding global channel as the sender node can be assured that all nodes will be awake on the global slot and ready to receive the global data communication on the assigned global channel from the sender node. When a node wants to broadcast or multicast a message, the sender node can only send the broadcast or multicast message at global slots on the assigned global channel.

When a node of WSN 110 wants to send data in a unicast data transmission to another specific individual destination node in a local data communication, the sender node checks the slot and channel assignment information data structure to determine which slots and channels have been assigned to the specific destination node. Referring again to FIG. 6, if node A is the destination node, the sender node determines that the slots assigned to node A for local communication in the illustrated example embodiment are slots 304 and 314 of frame 320. The sender node can also determine from the slot and channel assignment information data structure that the channels assigned to node A for local communication in the illustrated example embodiment are channel 13 for slot 304 and channel 19 for slot 314 of frame 320. The sender node can then sleep until the next slot assigned to the destination node becomes active. When the destination node's slot becomes active, the sender node can wake up and begin the local data communication to the destination node on the corresponding assigned channel as the sender node can be assured that the destination node will be awake on its assigned slot and ready to receive the local data communication from the sender node on the corresponding assigned channel. The sender node can also use opportunistic scheduling for sending local data to a destination node. In cases when the broadcasting (i.e. global) slots are available and may become active sooner than a slot assigned to the specific destination node, a sender node may choose to use a broadcast slot (i.e. global slot) and a corresponding global channel to send the local information to the specific destination node. Information in the header of the data packet can be used to determine the identity of the intended destination node and whether the data packet is a local or a global data communication.

Some nodes of WSN 110 may assign the same slots to themselves, and they may receive data packets at the same slot on the same channel. Senders compete for the slot in the manner of Carrier Sense Multiple Access (CSMA). Before a node sends a data packet, the node can wait for a random amount of time and send the data packet if the channel is clear.

Slot and Channel Adaptation

During normal network operating conditions, all devices on the network wake up (i.e. activate their data transceivers) at the global slot(s) and on the global channel(s). Each individual network device can also wake up at its assigned slot(s) on its corresponding channel(s) for local data communications. In situations when the network conditions (e.g. network traffic load, network throughput, network error or retransmission rates, and the like) change, devices on the network can adapt to the current or anticipated network conditions by increasing or decreasing the number of slots assigned to a specific network device. Additionally, devices on the network can adapt to the current or anticipated network or environmental conditions by changing the sequence of channel assignments assigned to a specific network device. A node can detect the current or anticipated network conditions by monitoring the number of slots assigned to the node that are unused over a monitored period of time or over a monitored number of frames. For example, a node may determine that although the node has been waking up and listening for incoming local data on the node's specific assigned slots, the node has not received any local data communication for the last n frames. In this case, the node may conclude that it has over-allocated itself with slots for local communications. Because of this over-allocation of slots, the node may be wasting battery reserves by needlessly waking up too often. The node can compensate for this situation by de-assigning one or more of its assigned slots and advertising the de-assignment to the other network devices. By de-assigning one or more of its assigned slots, the node changes a slot and channel assignment back to an unassigned status. As a result, the node will wake up less often and thereby reduce its energy consumption and extend its battery life.

In other situations, for example, a node may determine that each time the node has been waking up and listening for incoming local data on the node's specific assigned slots, the node has received a quantity of incoming local data for the last n frames that exceeds a pre-determined threshold. In this case, the node may conclude that it has under-allocated itself with slots for local communications. Because of this under-allocation of slots, the node may be causing network delays; because the node is unable to consume the incoming local data at a fast enough rate. The node can adapt to this situation by assigning one or more additional slots to itself and advertising the new slot and channel assignment(s) to the other network devices. As a result, the node will wake up more often and thereby increase the rate at which it can receive data from the network.

In a similar manner, the number of slots assigned for global communications can be dynamically increased or decreased based on the quantity of global data that needs to be broadcast or multicast to the network devices. In this manner, each network device can detect network traffic conditions and adapt to the current or anticipated conditions by changing the device's slot allocations based on the detected network traffic conditions.

In normal operating conditions, network devices wake up on the global and local slots using the global and device-specific channel schedules (i.e. the sequence of communication channels). In addition, the network devices of WSN 110 can monitor their past behavior on specific channels. This channel monitoring may involve, 1) keeping a count of send/receive failures on their channel sequences, 2) sampling channels periodically for noise, 3) receiving channel noise information from a gateway, a network controller, or other network node, or 4) using a combination of any of these mechanisms. If one or more channels consistently fail over a period of time, a network device can create a new channel hopping schedule by selecting a new sequence of communication channels using the process described above. The new sequence of communication channels can include channels with a high success or high quality rating based on the monitored channel data. The success or quality rating can be based on detected or obtained channel performance data and defined in terms of a threshold (e.g. 80%).

A node of WSN 110 can also detect the current or anticipated network or environmental conditions that may affect data communications on a particular channel. Some sources of RF interference can cause disruption in data communications on particular channels of a wireless band. These channel disruptions can change rapidly over time and may cause variations in the particular channels that are affected. During normal data communications operations, a node may experience higher than expected data packet losses or slow data transfer rates on a particular channel. If these problems are detected for a particular channel by a particular node of WSN 110, the node can adapt to this situation by re-assigning one or more different channels to itself and advertising the new channel assignment(s) to the other network devices. The node can use the process described above to select one or more different channels for itself and thereby avoid the detected low quality channel. The slot and channel assignment information data structure can be updated to identify the detected low quality channel. As a result, the node will adaptively change its channel assignments based on network or environmental conditions and thereby increase the rate at which the node can send or receive data to/from the network. Additionally, because of the information recorded in the slot and channel assignment information data structure related to the detected low quality channel, other nodes will be unlikely to select the detected low quality channel. In this manner, the best quality channels dynamically become the most likely used channels in the wireless network based on current network and environmental conditions.

Given that the RF noise may vary periodically (for example, a pump coming on and off), an embodiment includes a process for recovering channels that were previously considered noisy and identified as low quality channels. In addition to the successful (i.e. higher quality) channels, the network device can also include n (e.g. 1, 2, 3, . . . ) noisy channels as part of its channel selection operation. The selection of noisy channels can be done by selecting, (a) channels randomly, (b) noisy channels next to successful channels, (c) noisy channels from different groups of spectrum, (d) learning the periodic nature of a channel becoming noisy, etc. Once a node completes its channel selection, the new channel hopping schedule is broadcast to the neighbor nodes on a broadcast channel using the advertising process described above.

As the network device observes changes in the status of noisy channels, the network device can create a new channel schedule that will include recently successful channels, and another set of possible noisy channels. This allows the devices to exploit channels as fully as possible. In a particular embodiment, channel quality data can be retained over time and analyzed for cyclic patterns. In some circumstances, RF interference can be cyclical based on, for example, the operating schedule of the source of the RF interference. These interference patterns can be detected over time as interference data is collected. Once these patterns are detected, the affected channels can be prospectively identified as low quality channels in the slot and channel assignment information data structure, even before the channels are detected as having been degraded by RF interference. As a result, these channels can be adaptively removed from the sequence of communication channels being used by the nodes of WSN 110. In a particular embodiment, after a pre-determined time period has elapsed, channels previously identified as low quality channels may be re-activated (i.e. the low quality rating retained in the slot and channel assignment information data structure is removed). By re-activating a previously designated low quality channel, it may be determined that the channel is no longer being affected by a source of RF interference. In this manner, a channel subject only to a transitory level of RF interference may be re-activated and used for subsequent high quality data communications. Similarly, if a channel is deemed perpetually noisy, it is removed from the channel sequence scheme. By expanding and contracting the channel hopping sequences, nodes ensure that they dynamically adapt to the noise conditions, and at the same time use the available channel resources fully.

Figure 7:
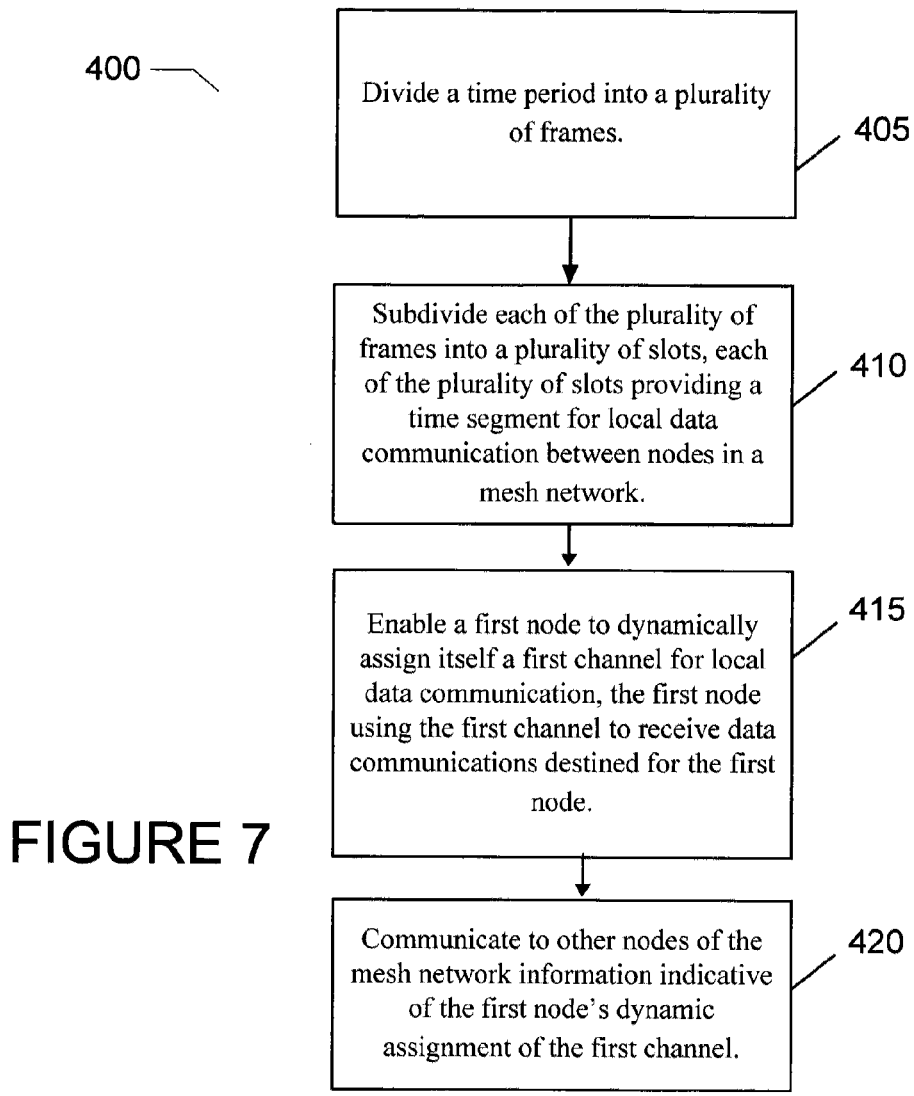
FIG. 7 is a flow diagram illustrating the processing flow for a particular example embodiment.

FIG. 7 is a flow diagram illustrating the basic processing flow 400 for a particular embodiment. As shown, an example embodiment is configured to divide a time period into a plurality of frames (processing block 405); subdivide each of the plurality of frames into a plurality of slots, each of the plurality of slots providing a time segment for local data communication between nodes in a mesh network (processing block 410); enable a first node to dynamically assign itself a first channel for local data communication, the first node using the first channel to receive data communications destined for the first node (processing block 415); and communicate to other nodes of the mesh network information indicative of the first node's dynamic assignment of the first channel (processing block 420).

In a particular embodiment, the network node includes a communication scheduler to divide a time period into a plurality of frames, the communication scheduler further to subdivide each of the plurality of frames into a plurality of slots, each of the plurality of slots providing a time segment for local data communication between the network node and other nodes in a mesh network, the communication scheduler further to enable the network node to dynamically assign itself a first channel for local data communication, the network node using the first channel to receive data communications destined for the network node; and a network interface to communicate to other nodes of the mesh network information indicative of the network node's dynamic assignment of the first channel.

In a particular embodiment, the sensor network includes a gateway to divide a time period into a plurality of frames, the gateway further to subdivide each of the plurality of frames into a plurality of slots, each of the plurality of slots providing a time segment for local data communication between the gateway and other sensors in the sensor network; and a sensor in wireless data communications with the gateway, the sensor being configured to dynamically assign itself a first channel for local data communication, the sensor using the first channel to receive data communications destined for the sensor, the sensor being further configured to wirelessly communicate to other sensors of the sensor network information indicative of the sensor's dynamic assignment of the first channel.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for adaptive channel hopping in a mesh network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising: dividing a time period into a plurality of frames; subdividing each of the plurality of frames into a plurality of slots, each of the plurality of slots providing a time segment for local data communication between nodes in a mesh network; enabling each node in the mesh network to dynamically assign itself one or more slots of the plurality of slots for receiving network communications; enabling each node in the mesh network to dynamically assign itself one or more channels for network communications, the one or more channels corresponding to distinct radio frequency bands; and configuring each node in the mesh network for communicating to other nodes of the mesh network information indicative of each node's dynamic assignment of a combination of the one or more slots and the one or more channels, the combination being dynamically self-assigned for network communications, each node having a single radio receiver for receiving network communications via the dynamically self-assigned combination of the one or more slots and the one or more channels, the single radio receiver being deactivated when a particular node is not communicating with the other nodes of the mesh network.

2. The method as claimed in claim 1 wherein each node assigns itself the one or more slots using a randomizer.

3. The method as claimed in claim 1 wherein each node assigns itself the one or more channels using a randomizer.

4. The method as claimed in claim 1 including detecting channel interference conditions and wherein each node assigns itself the one or more channels based on the detected channel interference conditions.

5. The method as claimed in claim 1 including detecting channel interference conditions and wherein each node de-assigns a previously assigned channel based on the detected channel interference conditions.

6. The method as claimed in claim 1 wherein each node advertises its slot and channel assignment information to other nodes of the mesh network.

7. The method as claimed in claim 1 wherein other nodes of the mesh network query a node for its slot and channel assignment information.

8. The method as claimed in claim 1 wherein a sending node of the mesh network sends a local data communication to a receiving node using a slot and a channel assigned to the receiving node by the receiving node.

9. The method as claimed in claim I wherein the mesh network is a wireless sensor network and at least one node is a wireless sensor device.

10. The method as claimed in claim 1 wherein the mesh network includes a gateway device.

11. A network node comprising:
a communication scheduler to divide a time period into a plurality of frames, the communication scheduler further to subdivide each of the plurality of frames into a plurality of slots, each of the plurality of slots providing a time segment for local data communication between the network node and other nodes in a mesh network, the communication scheduler further to enable the network node to dynamically assign itself one or more slots of the plurality of slots for receiving network communications, the communication scheduler further to enable the network node to dynamically assign itself one or more channels for network communications, the one or more channels corresponding to distinct radio frequency bands; and
a network interface to communicate to other nodes of the mesh network information indicative of the network node's dynamic assignment of a combination of the one or more slots and the one or more channels, the combination being dynamically self-assigned for network, communications, the network node having a single radio receiver for receiving network communications via the dynamically self-assigned combination of the one or more slots and the one or more channels, the single radio receiver being deactivated when the network node is not communicating with the other nodes of the mesh network.

12. The network node as claimed in claim 11 wherein the communication scheduler being further configured to enable the network node to dynamically assign itself one or more slots of the plurality of slots using a randomizer.

13. The network node as claimed in claim 11 wherein the communication scheduler being further configured to enable the network node to dynamically assign itself one or more channels using a randomizer.

14. The network node as claimed in claim 11 wherein the communication scheduler being further configured to detect channel interference conditions and wherein the network node assigns itself the one or more channels based on the detected channel interference conditions.

15. The network node as claimed in claim 11 wherein the communication scheduler being further configured to detect channel interference conditions and wherein the network node de-assigns a previously assigned channel based on the detected channel interference conditions.

16. The network node as claimed in claim 11 wherein the network interface being further configured to advertise its slot and channel assignment information to other nodes of the mesh network.

17. The network node as claimed in claim 11 wherein the network interface being further configured to receive a query from other nodes of the mesh network, the query including a request for the slot and channel assignment information for the network node.

18. The network node as claimed in claim 11 wherein the network interface being further configured to receive a local data communication destined for the network node from other nodes of the mesh network using a slot and a channel assigned to the network node by the network node.

19. The network node as claimed in claim 11 wherein the mesh network is a wireless sensor network and at least one node is a wireless sensor device.

20. The network node as claimed in claim 11 wherein the mesh network includes a gateway device.

21. A sensor network comprising:
a gateway to divide a time period into a plurality of frames, the gateway further to subdivide each of the plurality of frames into a plurality of slots, each of the plurality of slots providing a time segment for local data communication between the gateway and other sensors in the sensor network; and
a sensor in wireless data communications with the gateway, the sensor being configured to dynamically assign itself one or more slots of the plurality of slots for receiving network communications, the sensor being further configured to dynamically assign itself one or more channels for network communications, the one or more channels corresponding to distinct radio frequency bands, the sensor using a combination of the dynamically self-assigned one or more slots and the one or more channels to receive data communications destined for the sensor, the sensor being further configured to wirelessly communicate to other sensors of the sensor network information indicative of the sensor's dynamic self-assignment of the combination of slot and channel assignment, the sensor having a single radio receiver for receiving network communications via the dynamically self-assigned combination of the one or more slots and the one or more channels, the single radio receiver being deactivated when the sensor is not communicating with the other sensors of the sensor network.

22. The sensor network as claimed in claim 21 wherein the sensor being further configured to dynamically self-assign a second channel, the sensor using the second channel to receive data communications destined for all nodes of the sensor network.

23. The sensor network as claimed in claim 21 wherein the sensor being further configured to detect channel interference conditions and wherein the sensor assigns itself the one or more channels based on the detected channel interference conditions.

24. The sensor network as claimed in claim 21 wherein the sensor being further configured to detect channel interference conditions and wherein the sensor de-assigns a previously self-assigned channel based on the detected channel interference conditions.

25. An article of manufacture comprising a non-transitory machine-readable storage medium having machine executable instructions embedded thereon, which when executed by a machine, cause the machine to:
divide a time period into a plurality of frames;
subdivide each of the plurality of frames into a plurality of slots, each of the plurality of slots providing a time segment for local data communication between nodes in a mesh network;
enable each node in the mesh network to dynamically assign itself one or more slots of the plurality of slots for receiving network communications;
enable each node in the mesh network to dynamically assign itself one or more channels for network communications, the one or more channels corresponding to distinct radio frequency bands; and to
configure each node in the mesh network to communicate to other nodes of the mesh network information indicative of each node's dynamic assignment of a combination of the one or more slots and the one or more channels, the combination being dynamically self-assigned for network communications, each node having a single radio receiver for receiving network communications via the dynamically self-assigned combination of the one or more slots and the one or more channels, the single radio receiver being deactivated when a particular node is not communicating with the other nodes of the mesh network.

* * * * *